(12) United States Patent
Baldwin et al.

(10) Patent No.: US 7,206,394 B2
(45) Date of Patent: *Apr. 17, 2007

(54) METHODS AND SYSTEMS FOR DYNAMIC, RULES-BASED PEG COUNTING

(75) Inventors: Patricia A. Baldwin, Raleigh, NC (US); David K. Noden, Richardson, TX (US); Joseph Yu-Lung Wan, Richardson, TX (US)

(73) Assignee: Tekelec, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/797,415

(22) Filed: Mar. 10, 2004

(65) Prior Publication Data

US 2004/0233851 A1    Nov. 25, 2004

Related U.S. Application Data

(60) Provisional application No. 60/453,233, filed on Mar. 10, 2003.

(51) Int. Cl.
*H04M 15/00* (2006.01)

(52) U.S. Cl. ....................... 379/137; 379/133

(58) Field of Classification Search ................ 379/133, 379/134, 137, 126, 114.01, 229, 32.01, 32.02, 379/112.01
See application file for complete search history.

(56) References Cited

U.S. PATENT DOCUMENTS

| | | | | |
|---|---|---|---|---|
| 5,937,412 A | * | 8/1999 | Kohli et al. ............. | 707/104.1 |
| 5,940,487 A | * | 8/1999 | Bunch et al. ........... | 379/201.03 |
| 6,118,936 A | * | 9/2000 | Lauer et al. ............. | 709/224 |
| 6,327,350 B1 | * | 12/2001 | Spangler et al. ........ | 379/115.01 |
| 6,625,266 B1 | * | 9/2003 | Saari et al. ............ | 379/112.01 |
| 7,106,849 B2 | * | 9/2006 | Baratz et al. ........... | 379/221.08 |
| 2002/0054587 A1 | * | 5/2002 | Baker et al. ............. | 370/352 |

OTHER PUBLICATIONS

Notification of Transmittal of the International Search Report and the Written Opinion of the International Searching Authority, or the Declaration for International Application No. PCT/US04/07332 (Feb. 24, 2005).

* cited by examiner

*Primary Examiner*—Barry Taylor
(74) *Attorney, Agent, or Firm*—Jenkins, Wilson, Taylor & Hunt, P.A.

(57) ABSTRACT

Methods and systems for dynamic, rules-based peg counting are disclosed. According to one method, a user creates peg counter definitions using a rules-based language accessible via a graphical user interface. The peg counter definitions are downloaded from an administration server to network monitoring site collectors. The site collectors automatically detect the new peg counter definitions and begin using the new peg counter definitions without ceasing existing peg counting. Peg counter software on the site collectors periodically sends peg counter instances to a data gateway server. The data gateway server aggregates the peg counter instances generated by the various site collectors into system wide peg counter instances.

40 Claims, 11 Drawing Sheets

METHODS AND SYSTEMS FOR DYNAMIC, RULES-BASED PEG COUNTING

RELATED APPLICATIONS

This application claims the benefit of U.S. provisional patent application No. 60/453,233, filed Mar. 10, 2003, the disclosure of which is incorporated herein by reference in its entirety.

TECHNICAL FIELD

The present invention relates to methods and systems for collecting network traffic statistics. More particularly, the present invention relates to methods and systems for dynamic, rules-based peg counting.

BACKGROUND

In telecommunications signaling networks, it is often necessary to count the number of signaling messages that match user-specified criteria. For example, for usage measurements or billing purposes, it may be necessary to count the number of messages of a particular type originating from a particular source and/or being sent to a particular destination. In order to keep track of such counts, network operators define accumulators in hardware or software associated with signaling link monitoring systems. These accumulators are referred to as peg counters. Each peg counter has a definition and an associated accumulator value. The definition specifies rules for incrementing the accumulator value. For example, the definition may specify that the accumulator value is to be incremented based on detection of messages of a user-specified type and having user-specified parameter values. The accumulator values are also referred to as peg counts.

Conventionally, peg counts have been generated using signaling link probes and software that is hard-coded to generate the peg counts that a particular service provider desires to obtain. In such systems, if the service provider desires to add or change the peg counts being generated, peg count generation must be stopped, the peg count generation software must be modified, and the software must be recompiled and re-loaded into memory of the computer performing the peg counting. Some conventional systems provide a user interface for modifying peg count generation. However, even these systems require that peg counting be stopped while the changes are made. In addition, conventional user-configurable peg count generation systems require that peg counter definitions be specified completely using binary or hexadecimal values, which requires expert knowledge of signaling message parameter fields.

Another problem associated with some conventional peg count generation systems is that peg counts are generated at a central location, rather than at message collection locations. As a result, entire messages must be sent across a service provider's internal network. Sending copies of all monitored messages across a service provider's network consumes bandwidth and reduces bandwidth available for other services. In addition, aggregating messages at a central location before generating peg counts greatly increases peg count generation time, because the peg counter application must process messages from all of the message collection locations to create each peg count.

Accordingly, there exists a need for improved methods and systems for defining, modifying, and activating signaling message peg counters.

DISCLOSURE OF THE INVENTION

The present invention includes methods and systems for dynamic rules-based peg counting. In order to configure peg counting, a user accesses an administration server and creates a peg counter using a rules-based language. The rules-based language includes message types and parameters that are presented to the user in drop-down lists via a graphical user interface. The rules-based language also includes logical operators, such as AND and OR, for combining message-parameter-based peg counter criteria. Once the user creates the peg counter, the peg counter may be downloaded to a plurality of network monitoring site collectors where the peg counting is performed.

Once a site collector receives a peg counter, the site collector stores the peg counter in a peg counter definition table. A peg counter application running on the site collector is also notified of a change in the peg counter definition table. Once the application receives the change notification, the new peg counter definition table is loaded into program memory and used by the peg counter application to generate new peg counter instances.

The site collectors begin incrementing the associated accumulator value in response to detecting messages matching the peg counter definition. More particularly, when a site collector receives a first signaling message matching a peg counter definition, the site collector creates a peg counter instance. The peg counter instance is a dynamically allocated accumulator that stores the number of occurrences of messages that match the peg counter definition. Each peg counter instance may be stored as a field in an in memory database. The field may be indexed by a user-created peg counter identifier, an origination ID, and a destination ID.

For each signaling message, the site collector determines whether the message matches any of the definitions stored in a peg counter definition table. For each peg counter definition that the signaling message matches, it is next determined whether a peg counter instance exists. This step may be performed by extracting the peg counter ID and the origination and destination IDs from the peg counter definition table and searching a peg counter instance table for a peg counter instance matching the definition. If a peg counter instance exists, its associated accumulator is incremented. If a peg counter instance does not exist, a new instance is created and its accumulator value is incremented.

At user-specified intervals, the site collectors may upload peg counter instances to a data gateway server. Different site collectors may upload instances of the same peg counter. The data gateway server may aggregate peg counter instances based on the combination of peg counter ID, origination ID, and destination ID. When the data gateway server aggregates peg counters, the data gateway server adds the associated accumulator values together.

Peg counters stored by the data gateway server may be periodically downloaded to one or more applications. The peg counters delivered to each application may be configurable by the user. For example, the data gateway server may be configured to deliver peg counters associated with queries to a particular database to a billing application. For a network security application, the data gateway server may be configured to deliver peg counters associated with messages that enable or disable signaling links so that the network security application can determine whether the messages exceed a threshold level.

Because the present invention allows peg counters to be created or modified using a user-friendly graphical user interface and a rules-based language, peg counter creation time is greatly reduced over conventional peg counter implementations that require the user to know the binary or hexadecimal values for all message fields. In addition, because the site collectors can begin using peg counter definitions as soon as they are received and loaded into memory, the time required to activate new or modified peg counters is reduced over hard-coded peg counter implementations that require software upgrades for such changes. Finally, because the present invention distributes peg counter generation among the site collectors, the time required to accumulate peg count values is reduced over implementations in which peg counting is centralized.

Distributed peg counting also reduces unnecessary bandwidth consumption in a service provider's internal network because entire message copies are not required to be sent to a centralized location. In one implementation of the present invention, the only information that is required to be sent across the service provider's internal network is the accumulator value, the peg counter ID, the origination and destination IDs, a timestamp value indicating the time period to which the peg counter applies, a key type value indicating whether the origination and destination IDs are point codes or other types of identifiers, and a value indicating the total number of octets in the messages that were counted.

Accordingly, it is an object of the invention to provide improved methods and systems for defining and distributing network monitoring peg counters.

It is another object of the invention to provide a graphical user interface for facilitating the creation of new peg counters.

Some of the objects of the invention having been stated hereinabove, other objects will be evident as the description proceeds, when taken in connection with the accompanying drawings as best described hereinbelow.

BRIEF DESCRIPTION OF THE DRAWINGS

Preferred embodiments of the invention will now be explained with referenced to the accompanying drawings of which.

DETAILED DESCRIPTION OF THE INVENTION

Figure 1:
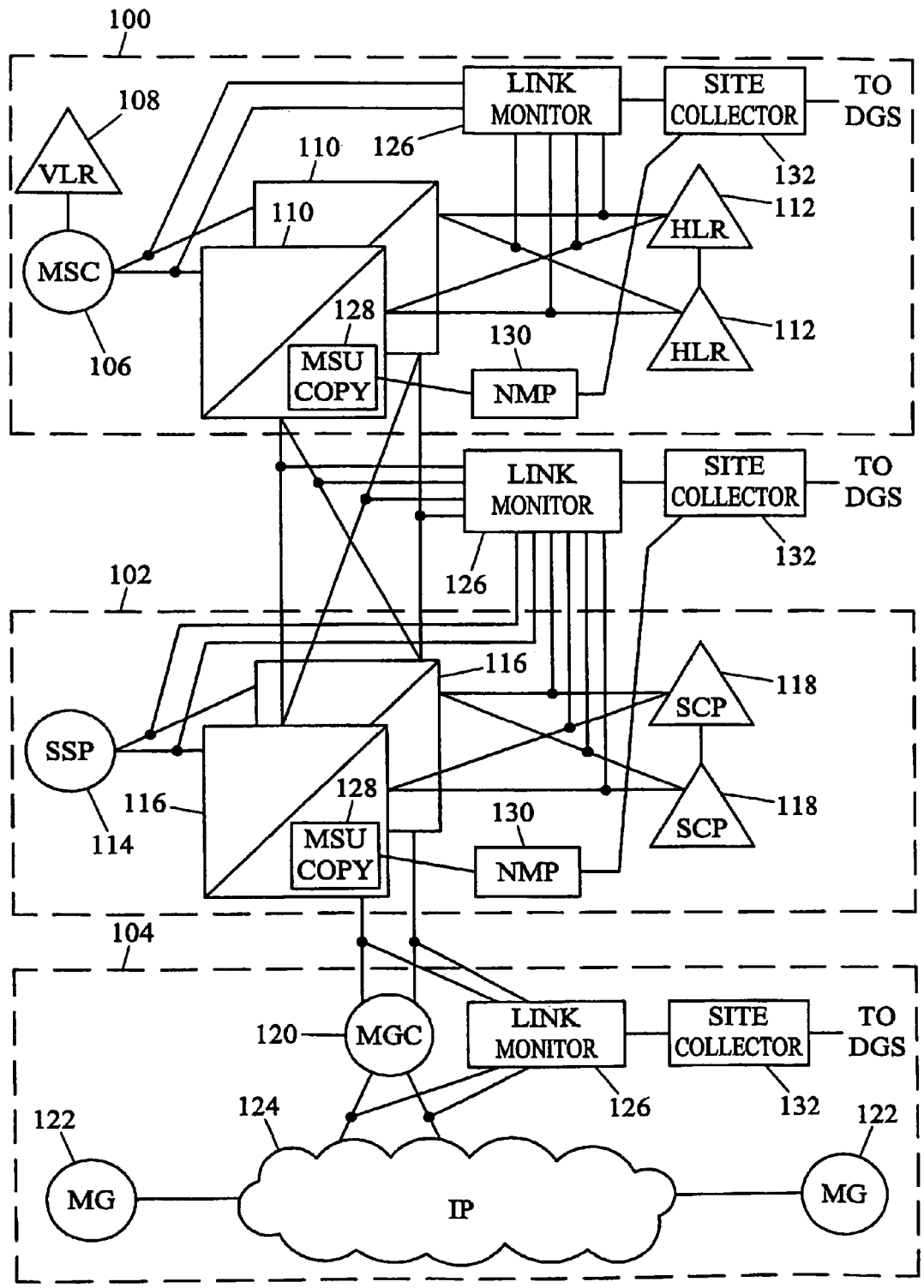
FIG. 1 is a block diagram of an exemplary operating environment for dynamic, rules-based peg counting according to an embodiment of the present invention.

As discussed above, the present invention includes method and systems for dynamic, rules-based peg counting. FIG. 1 illustrates an exemplary operating environment for dynamic, rules-based peg counting according to an embodiment of the present invention. Referring to FIG. 1, an exemplary telecommunications network includes various entities that generate and route signaling messages. In the illustrated example, the network includes a wireless component 100 for generating and routing signaling messages associated with wireless telecommunications, a wireline component 102 for generating and routing signaling messages associated with wireline communications, and an IP telephony component 104 for generating and routing signaling messages associated with IP telephony communications. Wireless component 100 includes a mobile switching center (MSC) 106, a visitor location register (VLR) 108, a signal transfer point (STP) pair 110, and a home location register (HLR) pair 112. MSC 106 originates and terminates calls to and from mobile subscribers. VLR 108 is a database that stores information regarding subscribers roaming in a particular network. STPs 110 route signaling messages between other network entities. HLRs 112 store subscriber records and subscriber location information.

Wireline component 102 includes a service switching point (SSP) 114, an STP pair 116, and a service control point (SCP) pair 118. SSP 114 originates and terminates calls to and from wireline subscribers. STP pair 116 routes signaling messages between other network entities. SCP pair 118 includes databases that store data relating to telephony services, such as line information database (LIDB) service, calling name service, number portability service, etc.

IP component 104 includes a media gateway controller 120 and media gateways 122. Media gateway controller 120 controls media gateways 122 to set up calls between end users via IP network 124. Media gateways 122 handle media stream communications between end users.

In order to collect messages in the network illustrated in FIG. 1, a plurality of link monitors 126 may be connected to signaling links at various locations in the network. Link monitors 126 may include link probes that connect to external signaling links that interconnect network elements. For example, if a link monitor 126 is co-located with an STP pair, the link monitor 126 may be connected to signaling links terminated by the STP pair. Exemplary commercially available link monitors suitable for use with embodiments of the present invention are the i2000 and i3000 shelves available from Tekelec of Calabasas, Calif. Briefly, these link monitors include external link probes that nonintrusively copy signaling messages from signaling links. The link monitors connect to a computing platform that includes a plurality of link interface controllers that interface directly with the link probes and link interface modules that run various link monitoring and traffic simulation applications.

In addition to external link monitors 126, internal link monitors 128 and associated network monitoring processors 130 may be used to copy and store signaling messages from within network routing nodes, such as STPs, without the use of external probes. An example of a probeless network monitoring system is described in commonly-assigned, copending U.S. patent application Ser. No. 10/164,226, filed on Jun. 5, 2002, the disclosure of which is incorporated herein by reference in its entirety. Briefly, this network monitoring system includes MSU copy functions located on link interface cards within signal transfer points. The signal transfer points also include network monitoring transport cards that transport messages copied from signaling links to network monitoring processors 130, which are external to the signal transfer points. Network monitoring processors 130 store copied signaling messages and forward the signaling messages to downstream network monitoring applications.

A plurality of site collectors 132 collect signaling messages copied from both internal and external link monitors. Each site collector 132 may include a general-purpose computing platform with a network interface for receiving message copies and delivering peg counters to external applications. Because site collectors 132 may be co-located with the link monitors and are usually located on the same local area network, bandwidth utilization between site collectors 132 and link monitors 126 is not of extreme concern. However, site collectors 132 must communicate information to downstream network monitoring applications, and these applications are typically not co-located with site collectors 132. Thus, it is preferable to minimize bandwidth usage between site collectors 132 and downstream network monitoring applications. Accordingly, rather than forwarding complete copies of messages received from the link monitors, site collectors 132 generate peg counter instances locally and forward the peg counter instances to downstream applications. Generating the peg counter instances at the network monitoring location reduces bandwidth utilization in service provider's internal network over centralized peg counting where message copies must be forwarded over the service provider's internal network to the peg counting location. In addition, because peg counter instance generation is distributed, the time required to generate peg counter instances is reduced over centralized implementations.

Although in the example illustrated in FIG. 1, link monitors 126 and site collectors 132 are shown as separate entities, the functions provided by these entities can be provided on a single platform. For example, link monitoring and message collection may be provided on any suitable hardware platform, such as a Sun Netra™ platform or a Tekelec TekServer™ platform without departing from the scope of the invention.

Figure 2:
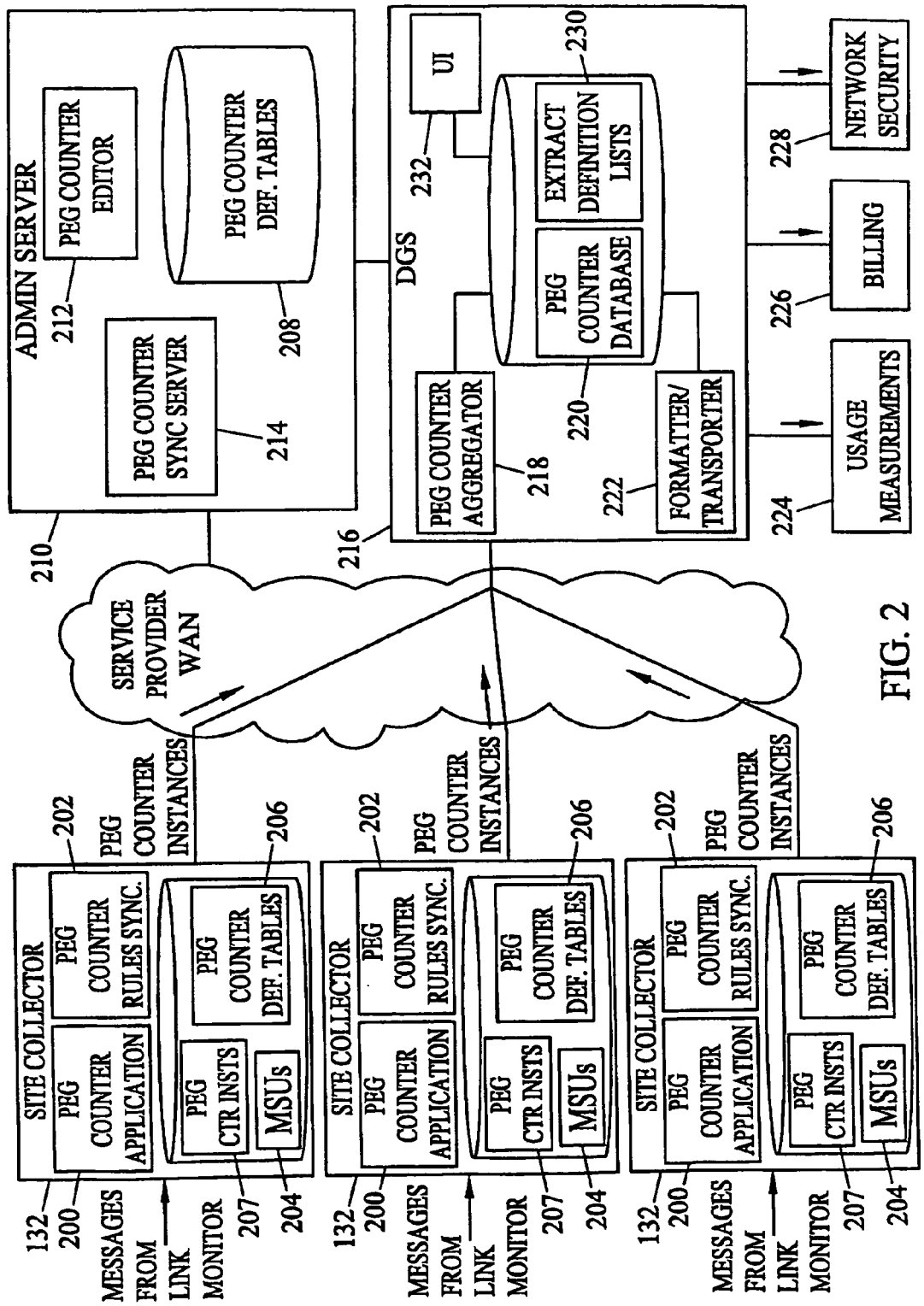
FIG. 2 is a block diagram illustrating a network data collection system for implementing dynamic rules-based peg counting according to an embodiment of the present invention.

FIG. 2 illustrates site collectors 132 and other components for dynamic, rules-based peg counting according to an embodiment of the present invention. Referring to FIG. 2, each site collector 132 includes a peg counter application 200, a peg counter rules synchronizer 202, an MSU database 204, peg counter definition tables 206, and peg counter instances 207. Peg counter applications 200 generate and increment peg counter instances 207 based on rules defined in peg counter definition tables 206. Peg counter rules synchronizers 202 dynamically update peg counter definition tables 206 based on updates made to peg counter definition tables 208 located on administration server 210. MSU database 204 stores MSUs copied by link monitors. Peg counter instances 207 store peg counter accumulator values and identifiers associated with each peg counter instance.

Administration server 210 includes functionality for defining rules-based peg counters and for distributing the peg counters to site collectors 132. In the illustrated example, administration server includes a peg counter editor 212, peg counter definition tables 208, and a peg counter synchronization server 214. Peg counter rules editor 212 provides a graphical user interface for allowing users to define peg counter rules using templates having drop down menus and logical operators for easily defining peg counters. Such an interface reduces the need for skilled technicians to define peg counters at the binary level. Peg counter definition tables 208 store peg counters defined using peg counter editor 212. Peg counter rules synchronization server 214 synchronizes peg counter rules in peg counter definition tables 208 of the administration server with those of site collectors 132.

Site collectors 132 preferably upload peg counter instances 207 at predetermined intervals to a data gateway server 216. Data gateway server 216 includes a peg counter aggregator 218, a peg counter database 220, and a peg counter formatter/transporter 222. Peg counter aggregator 218 aggregates peg counter instances received from the site collectors and stores the peg counter instances in peg counter database 220. Formatter/transporter 222 delivers peg counters to external applications at predetermined intervals. In the illustrated example, the external applications include a usage measurements application 224, a billing application 226, and a network security application 228. A user interface 230 allows users to define extract definition lists 232, which define the peg counters to be delivered to different applications.

Figure 3:
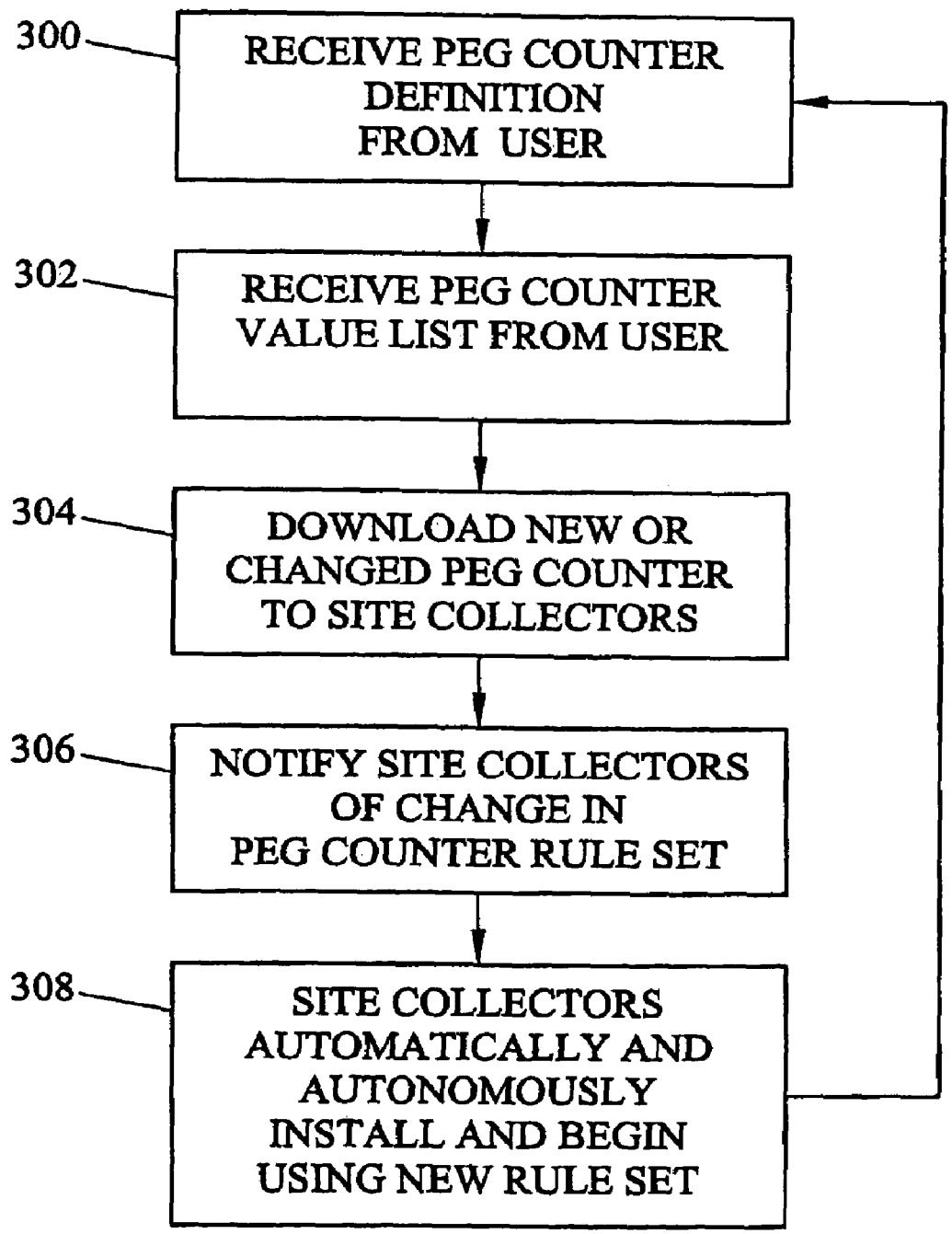
FIG. 3 is a flow chart illustrating exemplary steps for defining and distributing rules-based peg counters according to an embodiment of the present invention.

FIG. 3 is a flow chart illustrating exemplary steps for defining and distributing rules-based peg counters according to an embodiment of the present invention. Referring to FIG. 3, in step 300, peg counter editor 212 receives peg counter information from a user via a graphical user interface. The peg counter information may include a name that the user assigns to the peg counter and a peg counter definition. The graphical user interface includes menus and buttons that facilitate peg counter definition. Examples of such a graphical user interface will be described in detail below.

In step 302, peg counter editor 212 receives a peg counter value list from the user. A peg counter value list may include a list of parameters that are associated with multiple peg counters. For example, a peg counter value list may include a list of OPC and DPC values corresponding to ISUP messages for which it is desirable to implement peg counters. Value lists may also include SCCP parameters, such as calling and called party addresses. The use of value lists allows multiple peg counters to reference the same value list without requiring the value list to be re-created for each individual peg counter. This further reduces peg counter definition time.

In step 304, peg counter rules synchronization server 214 downloads new or changed peg counters to site collectors 132. In step 306, peg counter rules synchronization server 214 notifies the site collectors of a change in the peg counter rule set. In step 308, site collectors 132 automatically and autonomously install the new rule set. Steps 306 and 308 may be accomplished by setting a flag in a predetermined memory location on each site collector indicating that the peg counters in peg counter definition tables 206 have changed. Site collectors 132 may periodically poll the memory location to determine whether the change notification flag has been set. In response to detecting that the change notification flag has been set, each site collector may load the new peg counter definition tables into program memory accessible by peg counter application 200. Peg counter application 200 may begin using the new peg counter definition tables as soon as the tables have been loaded into program memory. Thus, using the steps illustrated in FIG. 3, peg counters can be added, updated, or deleted on the fly without requiring a code change.

Figure 4A:
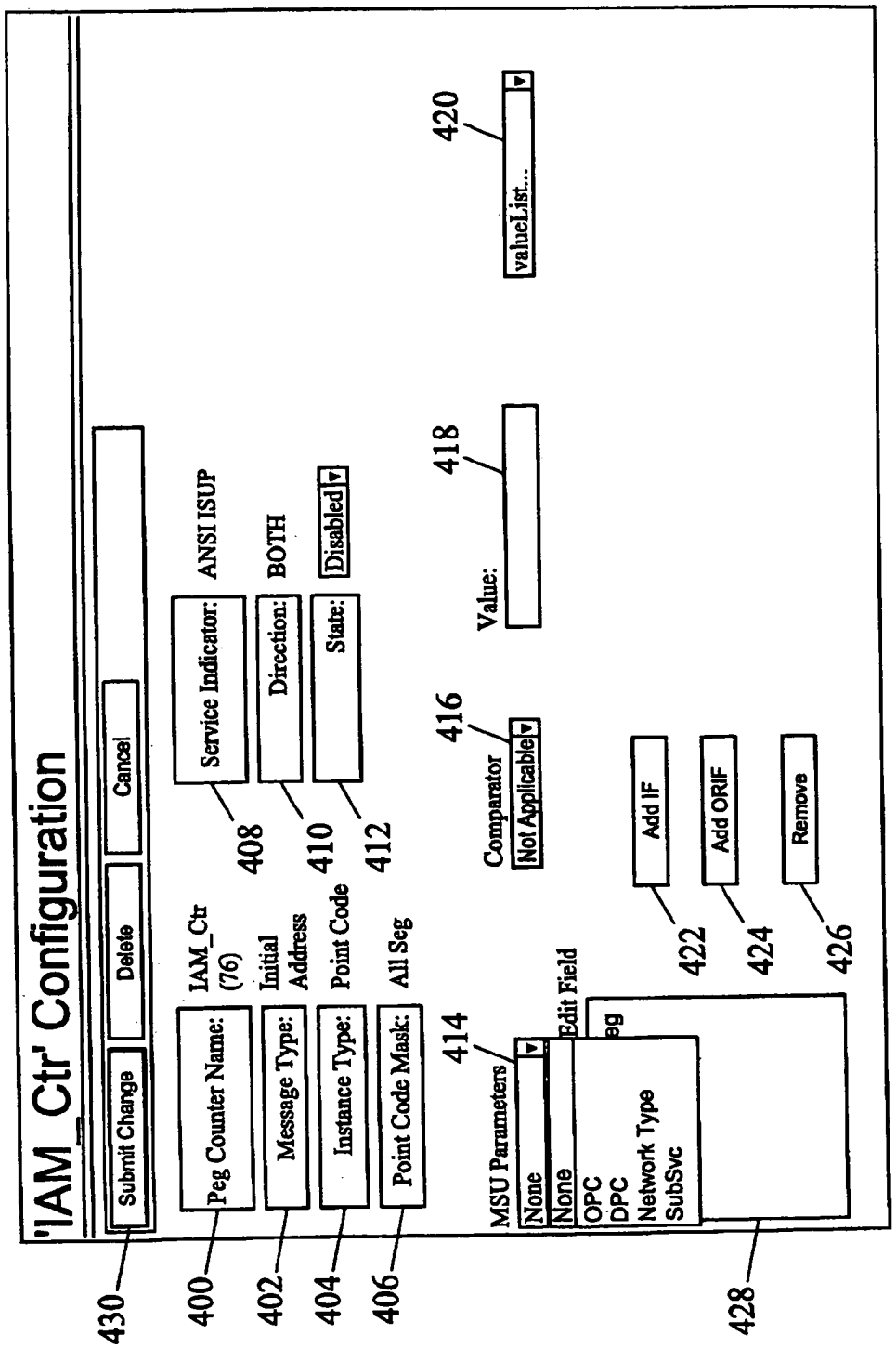
FIGS. 4A and 4B are schematic diagrams illustrating an exemplary graphical user interface for defining a rules-based peg counter where the user has defined an ISUP message peg counter according to an embodiment of the present invention.

FIG. 4A is a schematic diagram illustrating a peg counter definition screen that may be presented to a user by editor 212 where the user has defined an ISUP message peg counter. In the example illustrated in FIG. 4A, the peg counter definition screen includes some fields that allow the user to select textual representations of message parameter values and other fields in which the user can specify message parameters in binary or hexadecimal format. The fields in which the user may select or specify textual representations include peg counter name field 400, message type field 402, instance type field 404, point code mask field 406, service indicator field 408, and a direction field 410. Peg counter name field 400 stores a user-defined name for the peg counter. This name is preferably descriptive of the messages being counted. For example, a peg counter designed to count ISUP IAM messages may be called "IAMs." The peg counter name assigned by the user along with origination and destination IDs is preferably unique so that instances of the peg counter can be aggregated.

Peg counter message type field 402 allows the user to define the message type associated with the peg counter. For example, peg counter message type field 402 may present the user with textual representations of different SS7 and/or IP telephony message types, such as IAM, TCAP query, SIP INVITE, etc.

Peg counter instance type 404 defines parameters that will be associated with instances of this peg counter. In the illustrated example, the instance type is "point code," indicating that a point code or set of point codes will be used along with the peg counter name to identify an instance of a peg counter associated with this definition. For SCCP messages, peg counter instance type field 404 may allow the user to associate called and calling party address values with the peg counter instances. For IP telephony signaling messages, peg counter instance type field 404 may allow the user to associate source and destination IP addresses with the peg counter instances.

Point code mask field 406 indicates whether one or more segments of the point codes will be included in the peg counter instance. In SS7 networks, point codes include three segments. The first segment identifies the network with which the point code is associated, the second segment identifies the cluster with which the point code is associated, and the third segment identifies the node with which the point code is associated. In the illustrated example, all point code segments are included, so the peg counter instances will be associated with point codes identifying the sending and receiving nodes.

Service indicator field 408 allows the user to select the service indicator associated with the message type. Direction field 410 allows the user to select whether message signaling units (MSUs) in one direction or both directions will be associated with the peg counter instance.

Figure 4B:
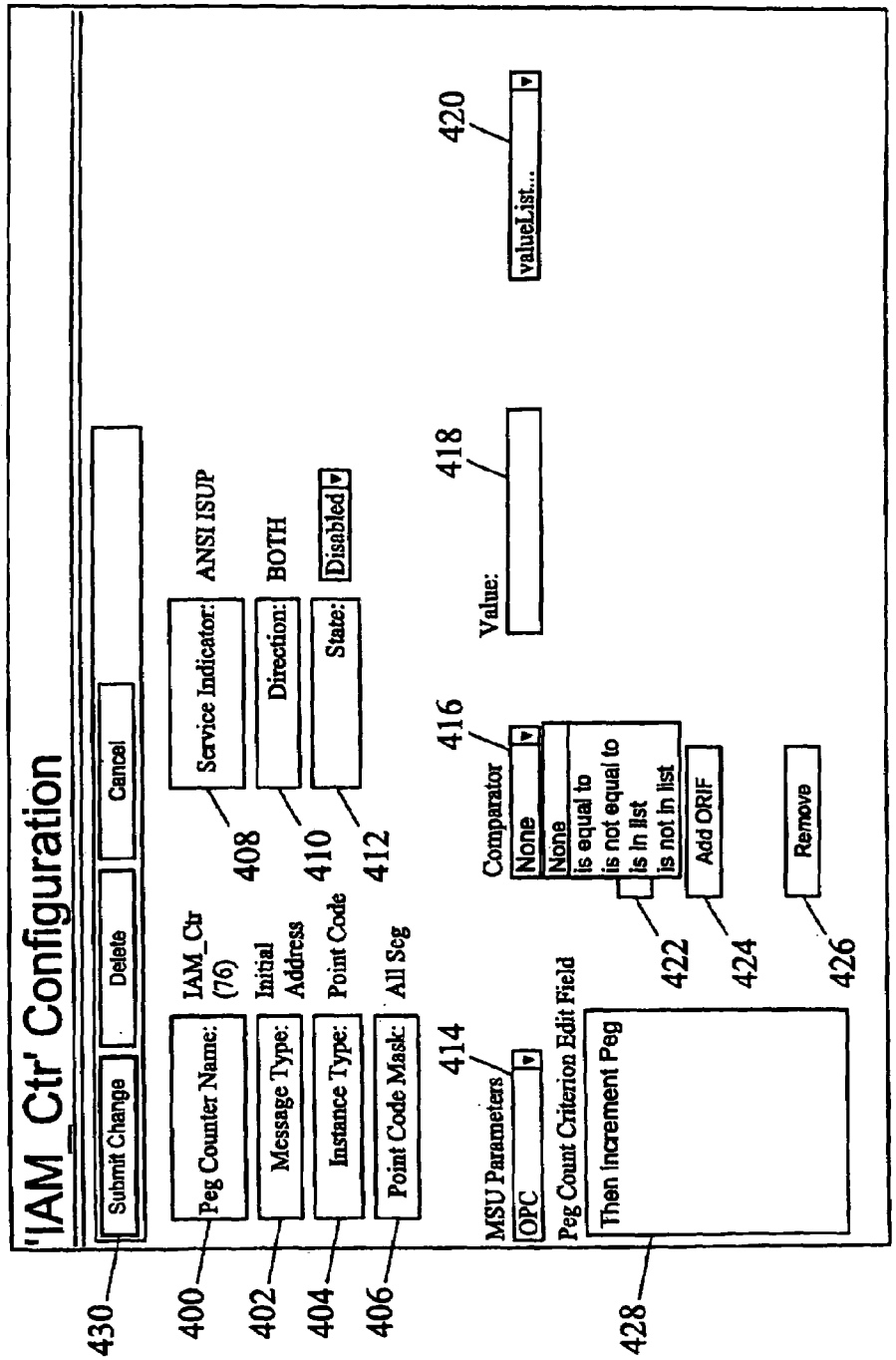

In addition to the fields described above, the peg counter definition screen also includes fields that allow the user to activate the peg counter and define parameter values to be associated with the peg counter. In FIG. 4A, these fields include a state field 412, an MSU parameters field 414, a comparator field 416, a value field 418, and a value list field 420. State field 412 allows the user to specify the state of the peg counter, i.e., whether the peg counter is enabled or disabled. MSU parameters field 414 includes a drop down list that allows a user to select one or more parameters associated with the message type. Comparator field 416 allows the user to select a mathematical operator for comparing the parameters stored in parameters field 414 with the value specified in value field 418 or a value list stored in value list field 420. Value field 418 allows the user to input parameter values manually, e.g., in decimal or hexadecimal format. Value list field 420 allows the user to select a value list containing multiple user-defined parameter values FIG. 4B illustrates exemplary comparators that may be stored in comparator field 418. In the illustrated example, the comparators include mathematical operators, such as "is equal to," "is not equal to," "is in list," and "is not in list." In defining a peg counter, the user may select "OPC" in MSU parameters field 414 and "is equal to" in comparator field 416. The user may then specify an OPC value, such as 1-1-1, in value field 418 to which the OPC in each received message is to be compared.

The user may combine message parameter comparison equations to be included in the peg counter definition. This combination is facilitated by ADD IF button 422, ADD OR IF button 424, remove button 426, and peg count criteria edit field 428. ADD IF button 422 allows users to combine message parameter comparison equations using a logical IF operator. The logical IF operator implies a logical AND operator. For example, if the user joins two conditions with the IF operator, both conditions must be true in order for the peg counter accumulator value to be incremented. ADD OR IF button 424 allows a user to combine message parameter comparison equations using a logical OR operator. If two conditions are ORed, either condition being true will result in incrementing of the peg counter accumulator value. Remove button 426 allows the user to remove previously defined message parameter comparison equations. Peg counter criteria and edit field 428 stores conditions or rules to be included in a peg counter. These conditions or rules include message parameter comparisons joined by logical operators. If peg counter criteria edit field 428 is blank, peg counter instances may be generated for all messages having the same message type as the peg counter, regardless of the message parameters. The final operation in peg counter edit field 428 is "Increment Peg," indicating that if a message matches the conditions, then the peg counter accumulator value is to be incremented.

Once the user changes a peg counter definition, the user clicks on submit change button 430. Clicking on submit change button 430 writes the peg counter to peg counter definition tables 208 on administrative server 212. This action triggers administrative server 212 to download the peg counters to site collectors 132, which can immediately begin using the new peg counter, using the steps described above.

Figure 5A:
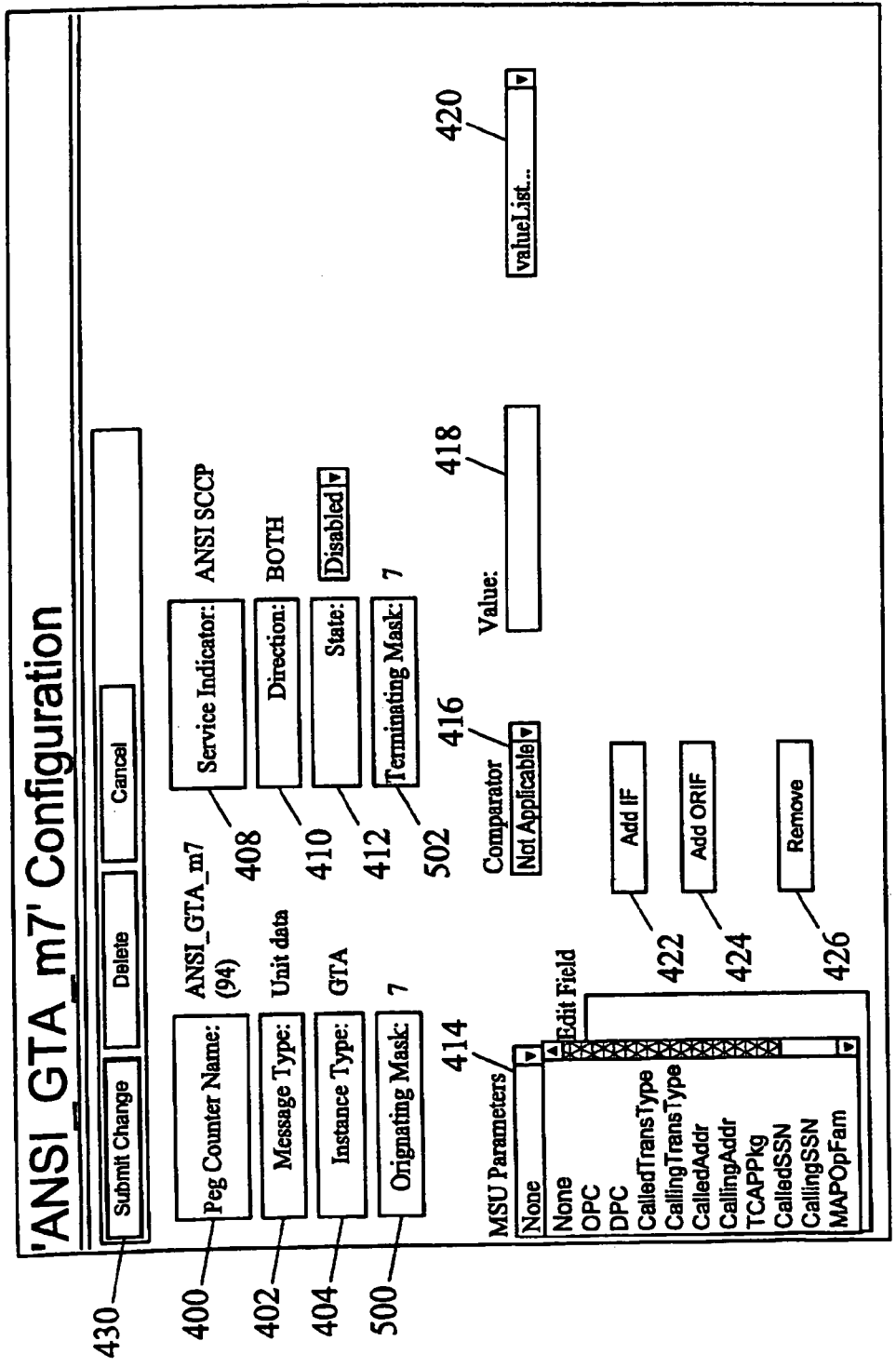
FIGS. 5A–5C are schematic diagrams illustrating an exemplary graphical user interface for defining rules-based peg counters where the user has defined a peg counter for SCCP messages according to an embodiment of the present invention.

FIG. 5A is a schematic diagram of a peg counter definition screen that illustrates parameter values that may be presented to the user once the user has selected SCCP as the message type for a peg counter. In FIG. 5A, the user has populated fields 400–410 with values for counting SCCP messages. For example, the user has selected "unitdata" for message type field 402 to indicated that only SCCP unitdata messages are to be counted. Instance type field 404 indicates that instances of this peg counter will be identified by global title address (GTA). In service indicator field 408, the user has selected "ANSI SCCP," indicating that ANSI SCCP messages are to be counted. In direction field 410, the user has selected "both," indicating that messages flowing in both directions on a monitored signaling link are to be counted. State field 412 indicates that the peg counter is initially disabled.

Because the selected message type is SCCP unitdata, some fields and parameters presented to the user may be SCCP-specific. For example, the peg counter configuration screen in FIG. 5A includes originating and terminating mask fields 500 and 502 that allow the user to specify the number of digits that will be included in the originating and terminating global title addresses associated with this peg counter. MSU parameters field 414 may also present the user with SCCP-specific parameters, such as called and calling party translation type and subsystem number. Since the SCCP protocol is used to carry TCAP and MAP messages, MSU parameters field may also present the user with TCAP and MAP parameter choices. The remaining buttons and fields in FIG. 5A have the same purposes as those described above with respect to FIGS. 4A and 4B. Hence, a description thereof will not be repeated herein.

Figure 5B:
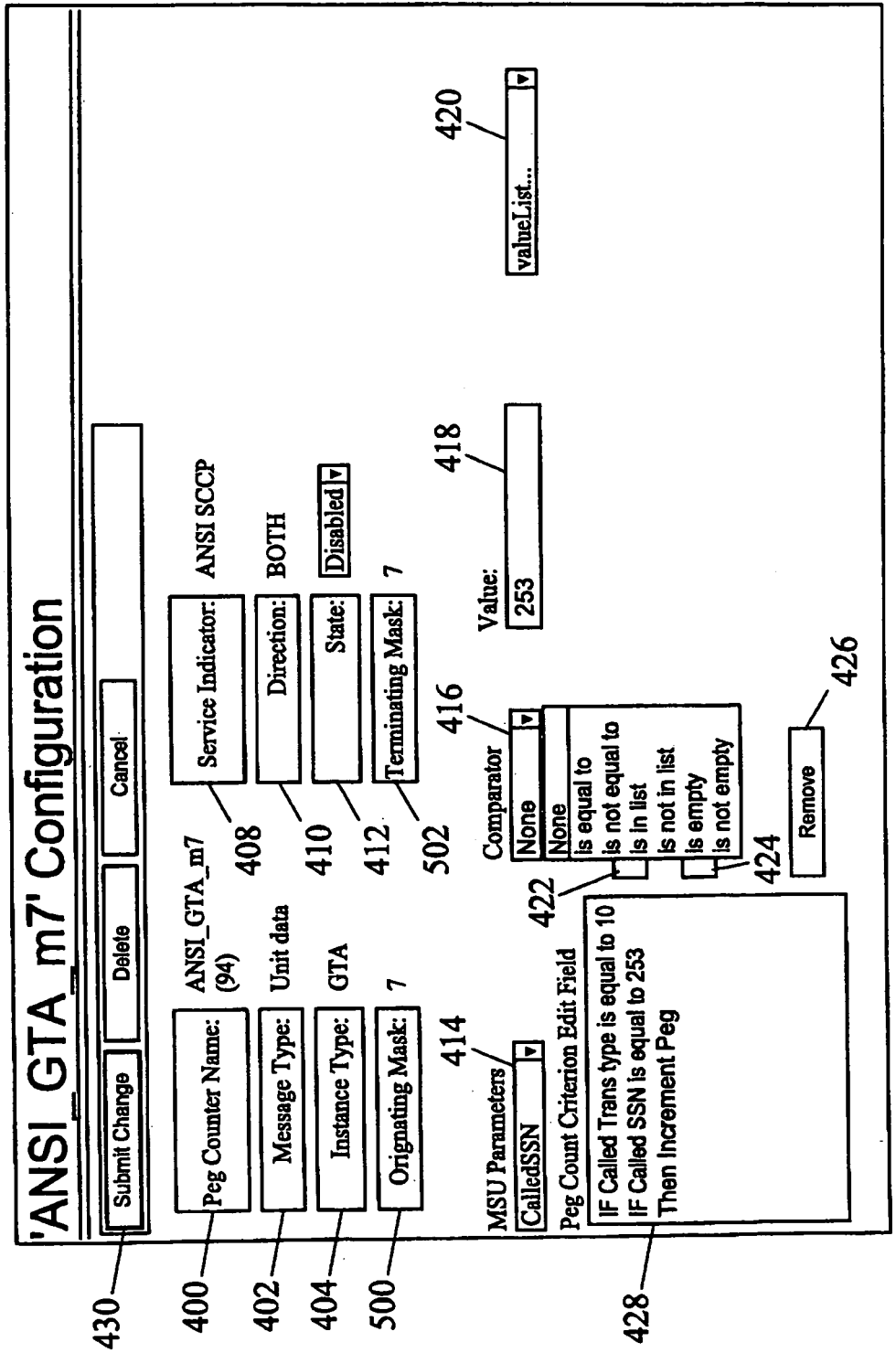

FIG. 5B is a schematic diagram of the peg counter definition in FIG. 5A illustrating the result of adding peg count criteria to peg count criteria edit field 428. In the illustrated example, the criteria for SCCP unitdata messages include a called party subsystem number being equal to 253 and a called party translation type being equal to ten. If both of these conditions are true, then the peg counter accumulator value is incremented.

Figure 5C:
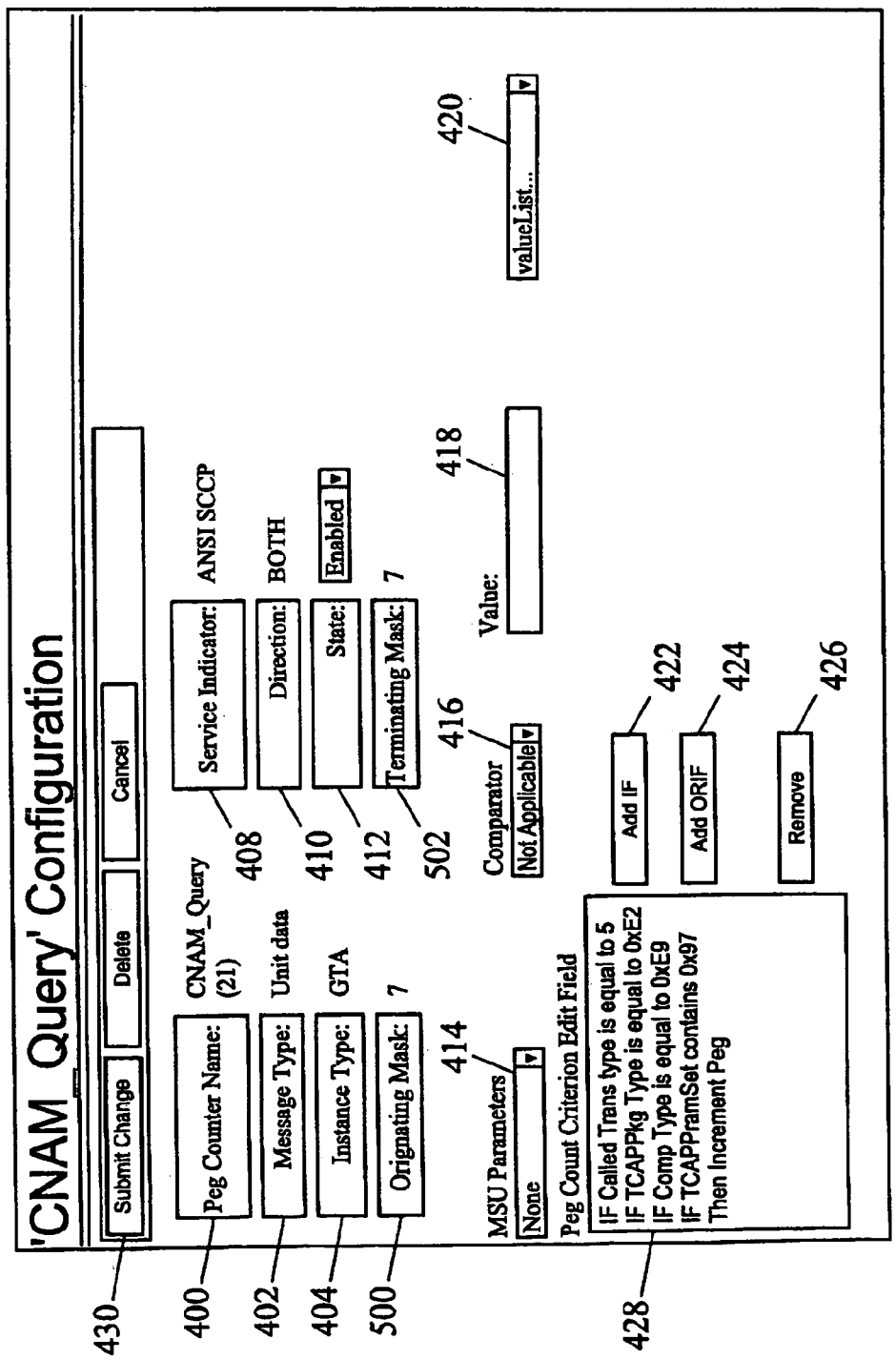

FIG. 5C is a schematic diagram illustrating a graphical user interface for generating rules-based peg counters in which peg count criteria edit field 428 contains rules defined by the user for counting calling name (CNAM) queries. Referring to FIG. 5C, peg count criteria edit field 428 contains a first statement that determines whether the called party translation type is five. The second line in peg counter criteria edit field 428 checks to see whether the TCAP package type is 0xE2. The third statement checks whether the component type is 0xE9. The fourth statement in criteria edit field 428 checks whether the TCAP parameter set contains 0x97. If all of these conditions are true, the CNAM query peg counter accumulator value is incremented.

As stated above, once the user creates a peg counter, the peg counter is stored in peg counter definition tables 208 on administration server 210. Table 1 shown below illustrates exemplary peg counter definitions that may be stored in peg counter definition tables 208.

TABLE 1

Peg Counter Definitions

| Peg Counter Name | Definition | |
|---|---|---|
| ISUP_IAMS | IF | ServiceIndicator = ISUP |
| | IF | MessageType = InitialAddress |
| | Then | Increment Peg |
| ISUP_Releases | IF | ServiceIndicator = ISUP |
| | IF | MessageType = Release |
| | Then | Increment Peg |
| IS41HLR_Query | IF | ServiceIndicator = SCCP |
| | IF | MessageType = UDT |
| | IF | CalledSSN = 6 |
| | IF | TCAPPkg = 226 |
| | IF | CalledTransType = 3 |
| | Then | Increment Peg |
| IS41HLR_Responses | IF | ServiceIndicator = SCCP |
| | IF | MessageType = UDT |
| | IF | CalledSSN = 6 |
| | IF | TCAPPkg = 228 |
| | IF | CalledTransType = 3 |
| | Then | Increment Peg |
| LIDB_CallingCard_Q | IF | ServiceIndicator = SCCP |
| | IF | MessageType = UDT |
| | IF | CalledTransType is in list LIDBTranTypeList |
| | IF | TCAPPkg = 226 |
| | IF | CompType = 233 |
| | IF | TCAPParamSet contains 0xDF70 % CCV1 indicator |
| | Then | Increment Peg |

TABLE 1-continued

Peg Counter Definitions

| Peg Counter Name | Definition | |
|---|---|---|
| LIDB_CC_Response | IF | ServiceIndicator = SCCP |
| | IF | MessageType = UDT |
| | IF | CalledTransType is in list LIDBTranTypeList |
| | IF | TCAPPkg = 226 |
| | IF | CompType = 233 |
| | IF | TCAPParamset does not contain 0xDF6A % collect accept ind |
| | IF | TCAPParamSet contains 0xDF4C % CCAN svc denial ORIF TCAPParamset contains 0xDF60 % PIN # ORIF TCAPParamSet contains 0xDF62 % PIN svc denial ORIF TCAPParamSet contains 0xDF67 % record status ind |
| | Then | Increment Peg |
| SIP INVITE | IF | Message Type = INVITE |
| | Then | Increment Peg |
| M3UA | IF | Adapter Layer = M3UA |
| | Then | Increment Peg |

In Table 1, the left hand column includes the name for each peg counter. The right hand column includes the peg counter definitions. One simple example of a rules-based peg counter definition illustrated in Table 1 is the ISUP_IAMS peg counter, which counts ISUP IAM messages. The rules for this peg counter are if the service indicator is ISUP and the message type is InitialAddress, then the peg counter accumulator value will be incremented.

Once the peg counters have been defined, the values specified for the parameters in the rules may be converted into binary or hexadecimal format and compared to the corresponding values in received messages. For example "ISUP" for the ServiceIndicator value on Table 1 may correspond to a binary hexadecimal value of 0x04. Similarly, "Initial Address" for message type may be converted to a hexadecimal value of 0x01 to indicate an ANSI ISUP message. Allowing the user to define peg counters using names for message types eliminates the need for the user to memorize binary values corresponding to the message types. For other message parameters, the may specify binary, decimal, or hexadecimal values in defining peg counter rules without departing from the scope of the invention. For example, as illustrated in row 2 of Table 1, the user may specify called party subsystem number, TCAP package type, and called party translation type as decimal values.

As illustrated in Table 1, the message parameter comparison equations are connected by logical operators IF and ORIF to create complex peg counter definitions. For example, in the sixth row in Table 1, a peg counter for a LIDB calling card response is defined. The peg counter for the LIDB calling card response includes multiple parameter comparisons, including SCCP, TCAP, and application level parameter comparisons. Such complex definitions can be easily created using the graphical user interfaces of the present invention, such as those illustrated above with regard to FIGS. 5A–5C. Thus, by providing an easy to use interface and logical operators that allow users to combine peg counter conditions, the present invention greatly reduces the time to initiate and modify peg counting in a network.

Figure 6:
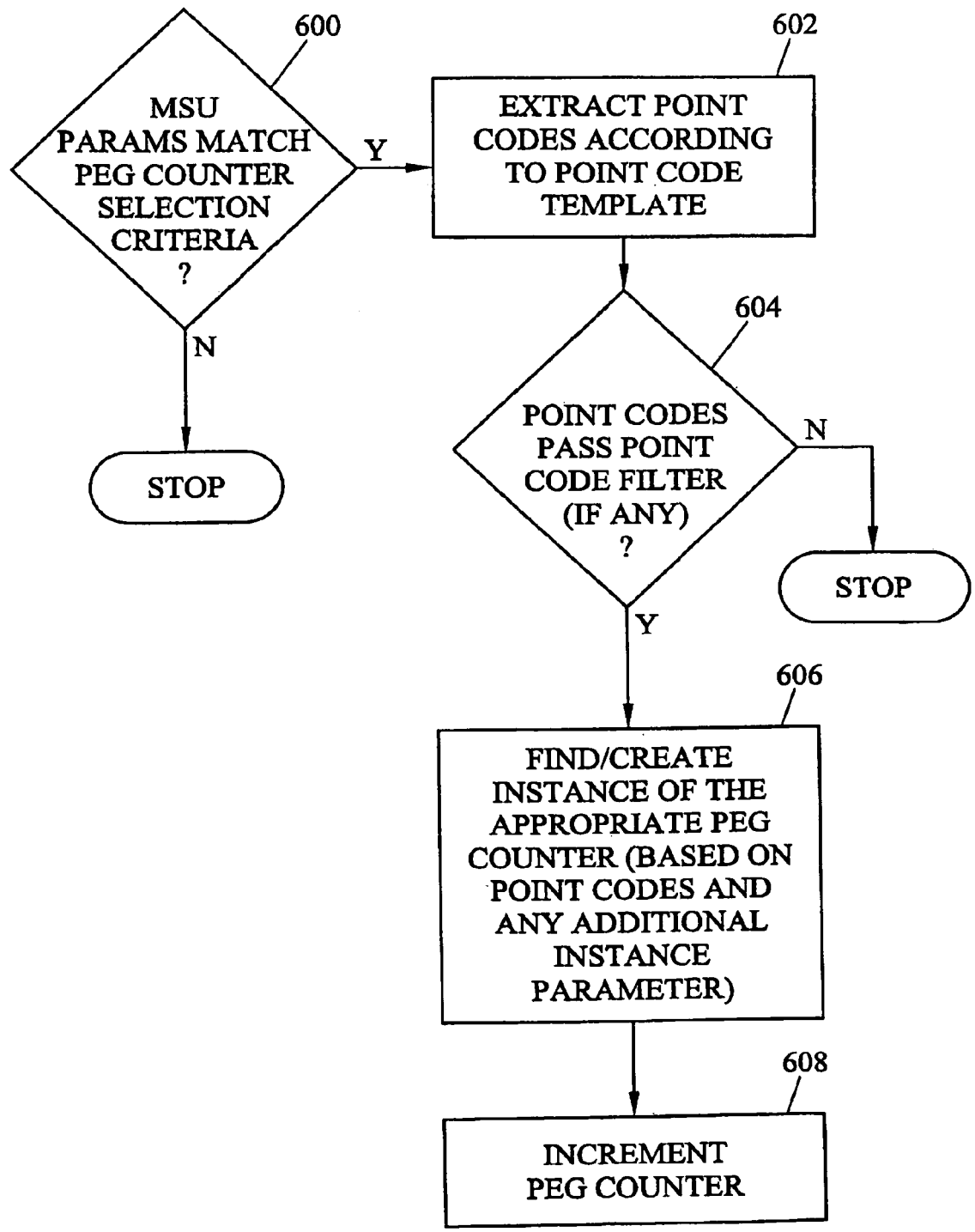
FIG. 6 is a flow chart illustrating exemplary steps for defining rules-based peg counters according to an embodiment of the present invention.

Once peg counters are created and activated, site collectors generate peg counter instances according to user-defined rules. FIG. 6 is a flow chart illustrating exemplary steps for generating peg counter instances at the site collectors according to an embodiment of the present invention. Referring to FIG. 6, in step 600, each site collector determines whether MSU parameters of a received MSU match any of the peg counter definitions in peg counter definition tables 206. If the parameters do not match any of the peg counter definitions, processing for this message ends and peg counter application 200 returns to step 600 for the next message. In step 602, peg counter application 200 extracts SS7 OPC and DPC values from the message using a particular point code template. For example, if the message is an ANSI message, peg counter application 200 may utilize an ANSI point code decode template to decode the point codes. If the message is ITU, peg counter application 200 may use an ITU point code decode template. In step 604, peg counter application 200 determines whether the message point codes extracted in steps 602 pass any point code filters defined by the user. For example, the user may define point code filters to exclude messages from certain nodes or networks from peg counting. If the message does not pass the point code filter, processing for this message ends and control returns to step 600 for the next message.

If the message passes the point code filters, control proceeds to step 606 where peg counter application 200 finds or creates an instance of the appropriate peg counter. If an instance of a peg counter has already been created based on a previously received message, step 606 may include locating that previously created instance. If an instance has not been created, step 606 includes creating a new instance of the peg counter. As indicated above, for SS7 messages, a peg counter instance may be identified by OPC, DPC, and peg counter name. Alternatively, SS7-based peg counter instances may be identified based on SCCP calling and called party addresses. IP telephony peg counters may be identified based on source and destination IP addresses or other identifiers for the calling and called parties or nodes. Once a peg counter instance has been located or created, control proceeds to step 608 where the accumulator value for the peg counter instance is incremented. Steps 606 and 608 may be repeated for each definition that the message matches in step 602, so that multiple peg counter instances may be created and/or incremented for the same message.

Figure 7:
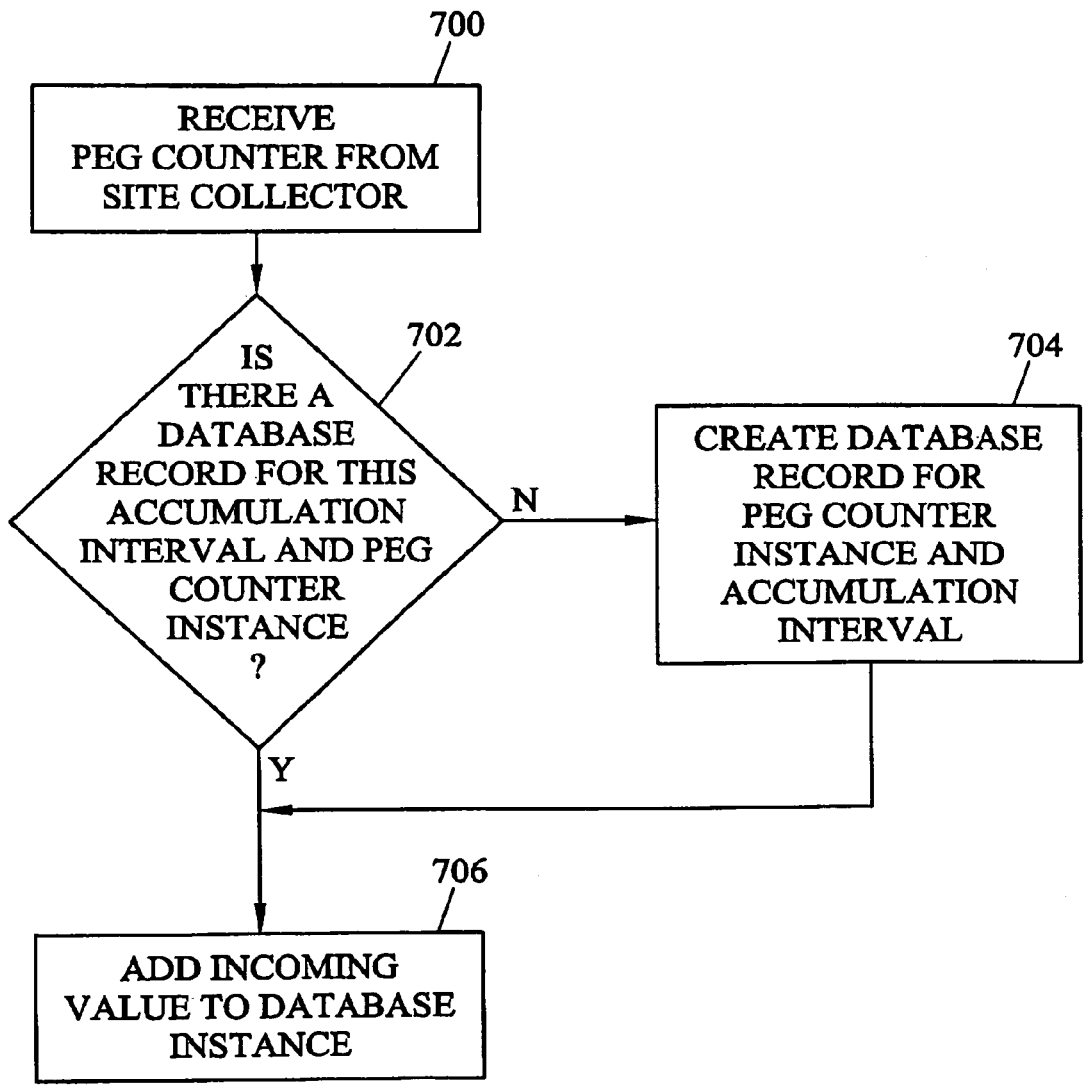
FIG. 7 is a flow chart illustrating exemplary steps for aggregating peg counter instances according to an embodiment of the present invention.

In order to reduce the processing and storage requirements on site collectors 132, peg counter instances are preferably uploaded to data gateway server 236 at predetermined intervals. Since the peg counter instances that are uploaded to a data gateway server may come from different network data collection locations, it is preferable that data gateway server 236 aggregate peg counter instances from different locations. FIG. 7 illustrates exemplary steps that may be performed by peg counter aggregator 218 resident on data gateway server 216 in aggregating peg counter instances. Referring to FIG. 7, in step 700, data gateway server 216 receives peg counters from one or more site collectors. In step 702, peg counter aggregator 218 determines whether there is a record in peg counter database 220 for the accumulation interval and peg counter instance. If a database record does not exist, control proceeds to step 704 where peg counter aggregator creates a new database record for the peg counter instance and accumulation interval. The database record may store the peg counter identifier, the accumulation interval, the originating and terminating IDs, the accumulator value, and the key type value. If a database record already exists, control proceeds to step 706 where peg counter aggregator 218 adds the accumulator value for the peg counter instance to the accumulator value in the existing database entry. The steps illustrated in FIG. 7 may be repeated for each peg counter instance received from site collectors 132 to create system wide peg counter instances. Aggregating peg counter instances into system wide peg counter instances avoids duplicate records and facilitates interpretation of peg counter data.

Figure 8:
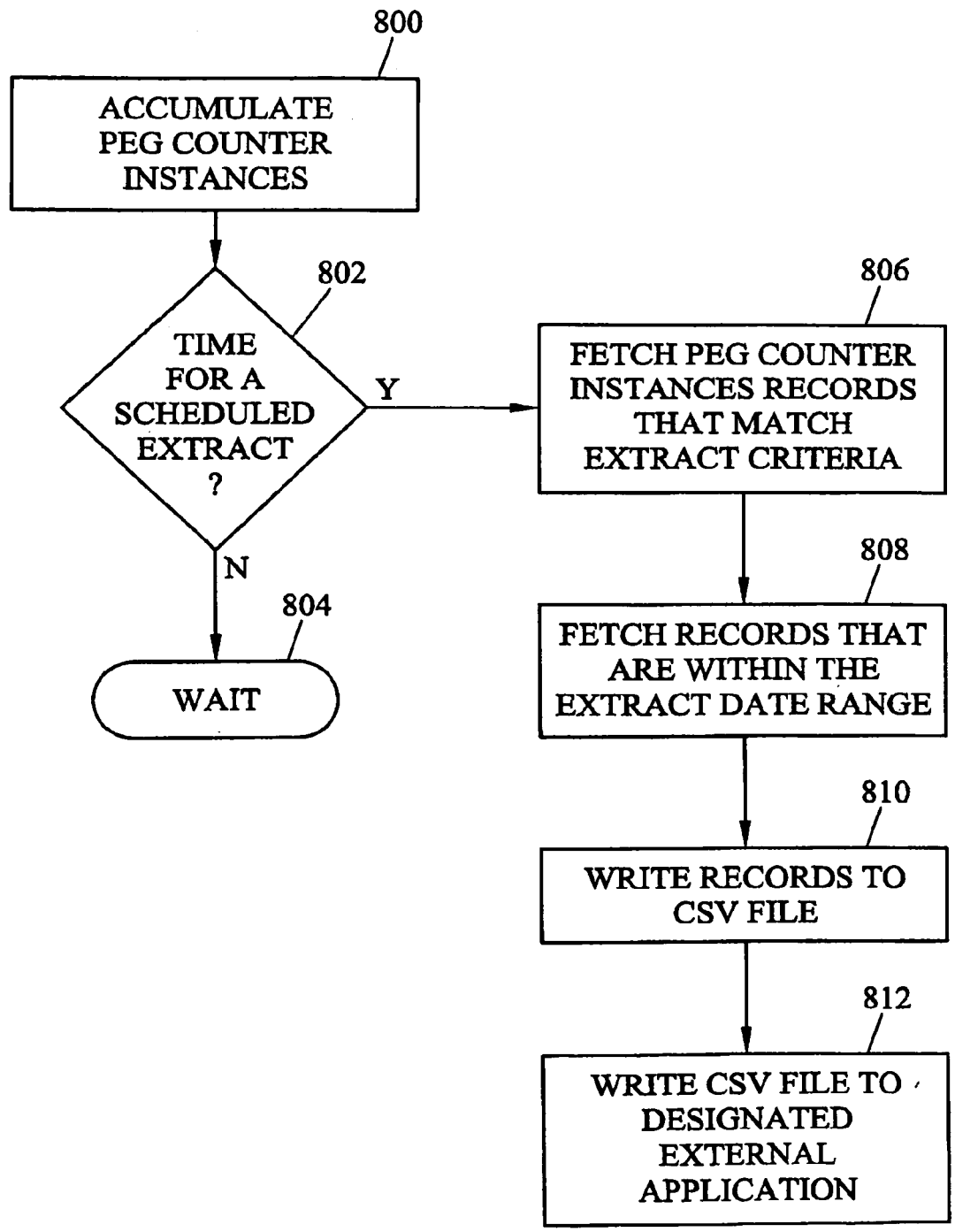
FIG. 8 is a flow chart illustrating exemplary steps for delivering peg counts to external applications according to an embodiment of the present invention.

Once peg counter information is accumulated at data gateway server 216, the peg counter information is preferably periodically delivered to external applications. FIG. 8 illustrates exemplary steps that may be performed by data gateway server 216 in delivering peg counters to external applications. Referring to FIG. 8, in step 800, data gateway server 216 accumulates peg counter instances. In step 802 data gateway server 216 determines whether it is time for a scheduled extract. If it is not time for a scheduled extract, control proceeds to step 804 where data gateway server 216 waits for the scheduled extract time. If, in step 802, it is determined that it is time for a scheduled extract, control proceeds to step 806 where formatter/transporter 222 formats peg counter instance records that match extract criteria into application specific format.

Extract definition lists for peg counters may be defined by an operator via user interface 232. Extraction can be based on the following criteria:

a) All peg counters for all origination and termination values, b) a list of specific peg counter names, or c) a list of specific OPC/DPC combinations (optional).

In step 808, formatter/transporter 222 extracts records that are within the extract date range defined in the extract definition list. In step 810, formatter/transporter 222 writes the peg counter records to a predetermined file format. In the illustrated example, the file format is comma separated variable format. In step 812, formatter/transporter 222 writes the peg counter file to the designated external application. This step may be performed using any suitable reliable communications procedure, such as network file system (NFS). Thus, using the steps illustrated in FIG. 8, peg counters tailored to each individual application are delivered to the individual application.

Thus, as described above, the present invention includes methods and systems for dynamic, rules-based peg counting. A user defines peg counters using a graphical user interface and a rules-based language. The peg counters are downloaded to site collectors, which begin using the peg counters on the fly without requiring time-consuming software upgrades. Peg counter instances are uploaded to a data gateway server at user-defined intervals. The data gateway server aggregates peg counter instances that relate to the same peg counter and time interval. Thus, the present invention consumes less network bandwidth and decreases peg counter generation time over centralized approaches.

What is claimed is:

1. A method for dynamic rules-based peg counting comprising:

(a) at a plurality of signaling message site collectors, generating peg counter instances by comparing monitored signaling messages received by the site collectors to existing peg counter definitions, each peg counter instance including an accumulator value indicating a number of the signaling messages that match one of the existing peg counter definitions and an identifier for identifying the associated peg counter definition;

(b) receiving new peg counter definitions; and (c) in response to receiving the new peg counter definitions, switching to the new peg counter definitions on the fly and generating peg counter instances based on the new peg counter definitions.

2. The method of claim 1 wherein generating peg counter instances includes:
(a) determining whether a monitored signaling message matches one of the peg counter definitions;
(b) in response to determining that a monitored signaling message matches one of the peg counter definitions, determining whether a peg counter instance exists for the matching peg counter definition; and
(c) in response to determining that a peg counter instance exists, incrementing an accumulator value associated with the peg counter instance.

3. The method of claim 2 comprising, in response to determining that a peg counter instance does not exist, creating a new peg counter instance for the matching peg counter definition and incrementing an accumulator value associated with the peg counter instance.

4. The method of claim 2 wherein determining whether a peg counter instance exists includes determining a peg counter identifier corresponding to the matching peg counter definition and searching for a peg counter instance having the peg counter identifier.

5. The method of claim 1 wherein the peg counter definitions include rules for generating peg counter instances based on SS7 messages.

6. The method of claim 1 wherein the peg counter definitions include rules for generating peg counter instances based on Internet Engineering Task Force SIGTRAN signaling messages.

7. The method of claim 1 wherein the peg counter definitions include rules for generating peg counter instances based on IP telephony signaling messages.

8. The method of claim 1 comprising creating the new peg counter definitions using a rules-based language.

9. The method of claim 8 wherein creating the new peg counter definitions using a rules-based language includes presenting a user with lists of messages and message parameters and receiving input from the user regarding messages, message parameters, and values for the message parameters.

10. The method of claim 9 wherein creating the new peg counter definitions using a rules-based language includes presenting the user with comparator choices for comparing the message parameters to the message parameter values to create message parameter comparison equations and presenting the user with logical operators for combining the message parameter comparison equations and thereby creating a peg counter definition.

11. The method of claim 1 wherein receiving the new peg counter definitions includes:
(a) writing the new peg counter definitions to a database at an administration server;
(b) downloading the peg counter definitions to databases at the site collectors;
(c) notifying the site collectors of a change in their respective databases; and
(d) at the site collectors, in response to receiving the notification, loading the new peg counter definitions into program memory.

12. The method of claim 1 wherein switching to the new peg counter definitions on the fly includes switching to the new peg counter definitions without modifying or re-compiling computer code executing on the site collectors for generating the peg counter instances.

13. The method of claim 1 comprising transmitting the peg counter instances from the site collectors to a data gateway server.

14. The method of claim 13 comprising, at the data gateway server, aggregating the peg counter instances from the site collectors to form system wide peg counter instances.

15. The method of claim 14 wherein aggregating the peg counter instances includes:
(a) receiving a first peg counter instance from a first site collector, the first peg counter instance having a first peg counter identifier, a first timestamp, and a first accumulator value;
(b) searching for a peg counter instance having the first peg counter identifier and the first timestamp; and
(c) in response to locating a peg counter instance having the first peg counter identifier and the first timestamp, adding the first accumulator value to an accumulator value associated with the peg counter instance.

16. The method of claim 15 comprising, in response to failing to locate a peg counter instance having the first peg counter identifier and the first timestamp, storing the first peg counter instance as a new peg counter instance in a peg counter database.

17. A system for dynamic rules-based peg counting, the system comprising:
(a) a plurality of site collectors for receiving signaling messages and for generating peg counter instances based on the signaling messages matching existing peg counter definitions, the peg counter instances each including an accumulator value indicating a number of the received signaling messages matching one of the peg counter definitions and an identifier for identifying the associated peg counter definition; and
(b) an administration server operatively associated with the site collectors for receiving new peg counter definitions from a user and for communicating the new peg counter definitions to the site collectors, wherein, in response to receiving the new peg counter definitions, the site collectors are adapted to switch to the new peg counter definitions on the fly and to generate peg counter instances based on the new peg counter definitions.

18. The system of claim 17 wherein the site collectors are adapted to generate peg counter instances based on SS7 signaling messages sent over SS7 signaling links.

19. The system of claim 17 wherein the site collectors are adapted to generate peg counter instances based on Internet Engineering Task Force SIGTRAN signaling messages sent over IP signaling links.

20. The system of claim 17 wherein the site collectors are adapted to generate peg counter instances based on IP telephony signaling messages sent over IP signaling links.

21. The system of claim 17 wherein the site collectors are adapted to receive the signaling messages from signaling link probes.

22. The system of claim 17 wherein the site collectors are adapted to receive the signaling messages from message copy functions internal to a signaling node.

23. The system of claim 17 wherein the administration server is adapted to provide a rules-based language to the user for creating the peg counter definitions.

24. The system of claim 23 wherein the rules-based language includes message type identifiers, message parameter identifiers, comparators for creating message parameter comparison equations, and logical operators for combining the message parameter comparison equations.

25. The system of claim 17 wherein the administration server is adapted to download the new peg counter definitions to the site collectors and notify the site collectors of the presence of the new peg counter definitions.

26. The system of claim 17 comprising a data gateway server operatively associated with the site collectors and a plurality of applications, wherein the site collectors are adapted to upload the peg counter instances to the data gateway server at predetermined intervals.

27. The system of claim 26 wherein the data gateway server is adapted to aggregate the peg counter instances received from the site collectors and to generate application-specific peg counter instances in response to application-specific peg counter requests.

28. A computer program product comprising computer executable instructions embodied in a computer readable medium for performing steps comprising:
 (a) presenting the user with a computer based graphical template for defining a peg counter for counting signaling messages received by a site collector;
 (b) receiving input from the user via the template regarding parameter values to be extracted from the received signaling messages;
 (c) receiving input from the user via the template regarding values to be compared with the extracted parameter values;
 (d) receiving input from the user via the template regarding equations for comparing the extracted parameter values to the values specified in step (c); and
 (e) receiving input from the user via the template regarding logical operators for combining equations to form a definition for the peg counter.

29. The computer program product of claim 28 wherein presenting the user with a computer based graphical template for defining a peg counter includes presenting the user with a computer based graphical template including menus for selecting the parameters and logical operators.

30. The computer program product of claim 28 wherein receiving input from the user regarding parameter values to be extracted from received messages includes presenting the user with a menu of parameter names corresponding to a message type for the peg counter and allowing the user to select parameter names from the list.

31. The computer program product of claim 28 wherein receiving input from the user regarding parameter values to be compared with the extracted parameter values includes presenting the user with an input field for allowing the user to input parameter values.

32. The computer program product of claim 28 wherein receiving input from the user regarding parameter values to be compared with the extracted parameter values includes presenting the user with a menu of parameter value lists and receiving input from the user regarding one of the parameter value lists.

33. The computer program product of claim 28 wherein receiving input from the user regarding equations includes presenting the user with a menu of comparators and allowing the user to select comparators from the menu.

34. The computer program product of claim 28 wherein receiving input from the user regarding logical operators includes presenting the user with a menu including AND-based and OR-based operators and receiving input from the user regarding operators for combining the equations.

35. The computer program product of claim 28 comprising storing the peg counter definition in a database.

36. The computer program product of claim 28 comprising distributing the peg counter definition from an administration server to a plurality of network monitoring site collectors.

37. The computer program product of claim 36 comprising notifying the site collectors of the peg counter definition.

38. The method of claim 1 wherein the signaling messages received by the site collectors comprise signaling messages copied by at least one of link monitors internal to signaling nodes and link monitors external to the signaling nodes.

39. The system of claim 17 wherein the signaling messages received by the site collectors comprise signaling messages copied by at least one of link monitors internal to signaling nodes and link monitors external to the signaling nodes.

40. The computer program product of claim 28 wherein the received signaling messages comprise signaling messages copied by at least one of link monitors internal to signaling nodes and link monitors external to the signaling nodes.

* * * * *